United States Patent
Yamaguchi et al.

(10) Patent No.: US 8,154,699 B2
(45) Date of Patent: Apr. 10, 2012

(54) LIQUID CRYSTAL DISPLAY DEVICE

(75) Inventors: Shinya Yamaguchi, Mitaka (JP); Kyoko Kojima, Kunitachi (JP); Yoshiaki Toyota, Koshigaya (JP); Takeshi Ishida, Kodaira (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 272 days.

(21) Appl. No.: 12/474,312

(22) Filed: May 29, 2009

(65) Prior Publication Data

US 2009/0296031 A1    Dec. 3, 2009

(30) Foreign Application Priority Data

May 29, 2008 (JP) .................. 2008-140791

(51) Int. Cl.
*G02F 1/1343* (2006.01)
(52) U.S. Cl. .................. 349/143; 349/114; 349/139
(58) Field of Classification Search .................. None
See application file for complete search history.

(56) References Cited

U.S. PATENT DOCUMENTS

| | | | | |
|---|---|---|---|---|
| 5,959,708 A | * | 9/1999 | Lee et al. | 349/143 |
| 2005/0068483 A1 | * | 3/2005 | Lee et al. | 349/141 |
| 2007/0279559 A1 | * | 12/2007 | Mori et al. | 349/114 |
| 2008/0192190 A1 | * | 8/2008 | Lee et al. | 349/114 |
| 2008/0212009 A1 | * | 9/2008 | Nakano | 349/141 |

FOREIGN PATENT DOCUMENTS

| | | | |
|---|---|---|---|
| JP | 4-81820 A | * | 3/1992 |
| JP | 10-321232 A | * | 12/1998 |
| JP | 11-065482 | | 3/1999 |
| JP | 2000-338528 A | * | 12/2000 |
| JP | 2004-022224 | | 1/2004 |
| JP | 2004-191557 | | 7/2004 |

* cited by examiner

*Primary Examiner* — Mike Stahl
(74) *Attorney, Agent, or Firm* — Antonelli, Terry, Stout & Kraus, LLP.

(57) ABSTRACT

One of the pixel electrode and the counter electrode includes, on a protective film formed so as to cover the thin film transistor, a planar metal electrode formed so as to cover a rough surface formed in the reflective pixel part; and a planar transparent electrode formed in the reflective pixel part and the transparent pixel part so as to cover the metal electrode. Another one of the pixel electrode and the counter electrode includes, on an insulating film formed so as to cover the one of the pixel electrode and the counter electrode, a plurality of linear electrodes provided in parallel with one another so as to overlap the one of the pixel electrode and the counter electrode. The transparent electrode included in the one of the pixel electrode and the counter electrode is formed of a transparent conductive film which is formed through application.

12 Claims, 9 Drawing Sheets

RELATION BETWEEN FILM THICKNESS AND FLATNESS RATIO OF APPLIED TRANSPARENT CONDUCTIVE FILM $$\text{FLATNESS RATIO} \equiv \frac{R^a\max - R^b\max}{R^a\max}$$

$R^a\max$ MAXIMUM HEIGHT OF UNDERLYING LAYER $R^b\max$ MAXIMUM HEIGHT OF APPLIED FILM SURFACE

LIQUID CRYSTAL DISPLAY DEVICE

CROSS-REFERENCE TO RELATED APPLICATION

The present application claims priority from Japanese application JP 2008-140791 filed on May 29, 2008, the content of which is hereby incorporated by reference into this application.

BACKGROUND OF THE INVENTION

1. Field of the Invention

The present invention relates to a liquid crystal display device, and more particularly, to a liquid crystal display device employing an electric field parallel to the substrate, which is called an in-plane-switching (IPS) type.

2. Description of the Related Art

A so-called active matrix liquid crystal display device includes, in each pixel region formed on a surface of a substrate on a liquid crystal side, a thin film transistor which is turned on through supply of a scan signal from a gate signal line and a pixel electrode to which an image signal is supplied from a drain signal line via the turned-on thin film transistor.

A liquid crystal display device called an IPS type has a structure in which a counter electrode is formed on the substrate (TFT substrate) side including the thin film transistor so as to generate an electric field containing a component parallel to the substrate between the counter electrode and the pixel electrode.

A liquid crystal display device of the above-mentioned structure is known to have the pixel electrode and the counter electrode formed, for example, in the following manner. The pixel electrode (or counter electrode) is formed of a planar transparent conductive film which is formed over a substantially entire region of the pixel region. The pixel electrode (or counter electrode) has an insulating film formed thereon, the insulating film covering the pixel electrode (or counter electrode). The counter electrode (or pixel electrode) is formed of a plurality of linear transparent conductive films which are provided in parallel with one another on the insulating film so as to overlap the pixel electrode (or counter electrode).

The IPS type liquid crystal display device as described above may be structured to have an increased aperture ratio of pixels and to excel in wide viewing angle.

In the IPS type liquid crystal display device described above, the film thickness of the liquid crystal layer is formed to be relatively small and is made uniform, to thereby improve the contrast.

To make the film thickness small and uniform, the following technology has been known. According to the technology, at least on the TFT substrate, a resin film which is formed through application so as to cover the thin film transistor is used as a protective film, to thereby flatten a surface of the TFT substrate, and the pixel electrode (or counter electrode) and the counter electrode (or pixel electrode) are formed on a flat upper surface of the TFT substrate.

It should be noted that JP 2004-191557 A, JP 2004-22224 A, and JP 11-65482 A are cited as publicly known documents related to the subject application. JP 2004-191557 A, JP 2004-22224 A, and JP 11-65482 A all describe display devices employing a conductive film which is formed through application. However, the above-mentioned display devices are not intended to include the above-mentioned IPS type liquid crystal display devices.

As described above, in the IPS type liquid crystal display device, there is known a technology of forming the resin film through application in order to make flat the surface of the TFT substrate on a liquid crystal side.

However, it has been pointed out that, in order to further enhance the contrast in the liquid crystal display device, sufficient flatness cannot be obtained only with the above-mentioned resin film.

Further, in the case where the resin film is formed through application, process steps are increased. Therefore, it is desired to attain flatness in the surface of the TFT substrate on the liquid crystal side simultaneously.

SUMMARY OF THE INVENTION

An object of the present invention is to provide a liquid crystal display device in which a contrast thereof may be further enhanced.

Another object of the present invention is to provide a liquid crystal display device in which a contrast thereof may be enhanced without increasing process steps.

It should be noted that other objects of the present invention are made clear by the overall description of the subject specification or the accompanying drawings.

Among the inventions disclosed in the present invention, representative ones are described as follows:

(1) A liquid crystal display device according to the present invention includes, for example, in a pixel region on a surface of a substrate on a liquid crystal side: a thin film transistor which is turned on through supply of a scan signal from a gate signal line; a pixel electrode to which an image signal is supplied from a drain signal line via the thin film transistor thus turned on; and a counter electrode, which is formed on the pixel region so as to generate an electric field between the counter electrode and the pixel electrode, and is characterized in that:

the pixel region includes a reflective pixel part and a transparent pixel part;

one of the pixel electrode and the counter electrode includes, on a protective film formed so as to cover the thin film transistor: a planar metal electrode formed so as to cover irregularities formed in the reflective pixel part; and a planar transparent electrode formed in the reflective pixel part covering the metal electrode;

another one of the pixel electrode and the counter electrode includes, on an upper surface of an insulating film formed so as to cover the one of the pixel electrode and the counter electrode, a plurality of linear electrodes provided in parallel with one another so as to overlap the one of the pixel electrode and the counter electrode; and the transparent electrode included in the one of the pixel electrode and the counter electrode is formed of a transparent conductive film which is formed through application.

(2) In the liquid crystal display device of the present invention according to Item (1), the transparent conductive film is formed of corpuscles of an indium tin oxide, which are applied in a form of ink and are baked.

(3) In the liquid crystal display device of the present invention according to Item (1), the transparent conductive film is formed of a conductive polymer, which is applied in a form of ink and is baked.

(4) In the liquid crystal display device of the present invention according to Item (1), the transparent conductive film is formed of corpuscles of an indium tin oxide and a conductive polymer, which are applied in a form of ink and are baked.

(5) In the liquid crystal display device of the present invention according to Item (1), the transparent conductive film includes a plurality of layers, the plurality of layers including:

a film formed of corpuscles of an indium tin oxide, which are applied in a form of ink and are baked; and a film formed of a conductive polymer, which is applied in a form of ink and is baked.

(6) In the liquid crystal display device of the present invention according to Item (2), the transparent conductive film has a film thickness of 0 μm to 3 μm.

(7) In the liquid crystal display device of the present invention according to Item (3), the transparent conductive film has a film thickness of 0 μm to 1 μm.

(8) In the liquid crystal display device of the present invention according to one of Items (4) and (5), the transparent conductive film has a film thickness of 0 μm to 2 μm.

(9) A liquid crystal display device according to the present invention includes, for example, on a surface of the substrate on a liquid crystal side: a thin film transistor which is turned on through supply of a scan signal from a gate signal line; a pixel electrode to which an image signal is supplied from a drain signal line via the thin film transistor thus turned on; and a counter electrode for generating an electric field between the counter electrode and the pixel electrode, and is characterized in that:

one of the pixel electrode and the counter electrode includes a planar transparent electrode formed on an upper surface of a protective film formed covering the thin film transistor;

another one of the pixel electrode and the counter electrode includes, on an upper surface of an insulating film formed so as to cover the one of the pixel electrode and the counter electrode, a plurality of linear electrodes provided in parallel with one another so as to overlap the one of the pixel electrode and the counter electrode; and the one of the pixel electrode and the counter electrode is formed of a transparent conductive film formed by application.

(10) In the liquid crystal display device of the present invention according to Item (9), the transparent conductive film is formed of corpuscles of an indium tin oxide, which are applied in a form of ink and are baked.

(11) In the liquid crystal display device of the present invention according to Item (9), the transparent conductive film is formed of a conductive polymer, which is applied in a form of ink and is baked.

(12) In the liquid crystal display device of the present invention according to Item (9), the transparent conductive film is formed of corpuscles of an indium tin oxide and a conductive polymer, which are applied in a form of ink and are baked.

(13) In the liquid crystal display device of the present invention according to Item (9), the transparent conductive film includes a plurality of layers, the plurality of layers including: a film formed of corpuscles of an indium tin oxide, which are applied in a form of ink and are baked; and a film formed of a conductive polymer, which is applied in a form of ink and is baked.

(14) In the liquid crystal display device of the present invention according to Item (10), the transparent conductive film has a film thickness of 0 μm to 3 μm.

(15) In the liquid crystal display device of the present invention according to Item (11), the transparent conductive film has a film thickness of 0.05 μm to 1 μm.

(16) In the liquid crystal display device of the present invention according to one of Items (12) and (13), the transparent conductive film has a film thickness of 0.05 μm to 2 μm.

It should be noted that the above-mentioned structures are merely taken as examples. The present invention may be appropriately changed without departing from the scope of the technical idea thereof. Other examples of a structure of the present invention than the above-mentioned structures are made clear by an overall description of the subject specification or the accompanying drawings.

The liquid crystal display device having the above-mentioned structure is capable of further enhancing the contrast thereof. In addition, the contrast thereof may be enhanced without increase in production man-hours.

Other effects of the present invention are made clear by an overall description of the subject specification.

DETAILED DESCRIPTION OF THE INVENTION

Embodiments of the present invention are described with reference to the attached drawings. In the respective drawings and the embodiments, the same or similar components are denoted by the same reference symbols, and a repeated description thereof is omitted.

Figure 2A:
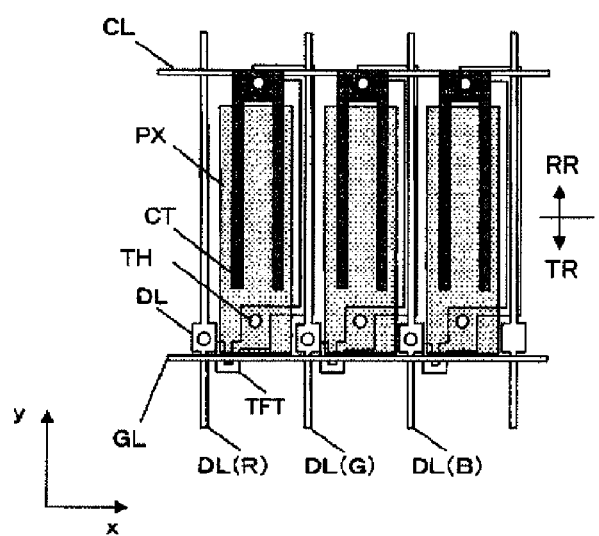
FIG. 2A is a plan view illustrating the embodiment of the structure of the pixel included in the liquid crystal display device according to the present invention.
Figure 2B:
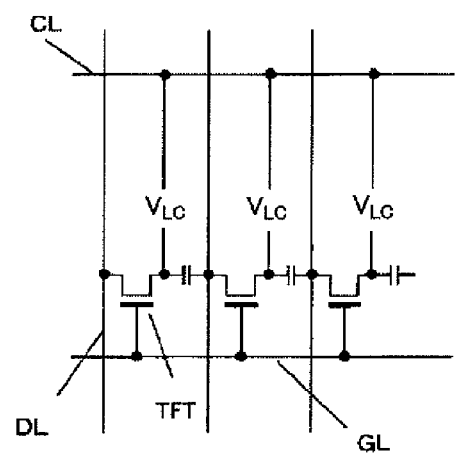
FIG. 2B is an equivalent circuit diagram illustrating the embodiment of the structure of the pixel included in the liquid crystal display device according to the present invention.

FIG. 2A is a plan view illustrating an embodiment of pixels included in a liquid crystal display device according to the present invention. FIG. 2B is an equivalent circuit diagram of the pixels illustrated in FIG. 2A and geometrically corresponds thereto.

Of a plurality of pixels arranged in matrix, the pixels illustrated in FIG. 2A indicate three pixels arranged in the x direction of FIG. 2A. The three pixels indicate, from the left side of FIG. 2A, a pixel for red color (R), a pixel for green color (G), and a pixel for blue color (B), respectively, and each serve as a unit pixel for color display.

Each pixel is formed in a region defined by a common signal line CL, a gate signal line GL, and a pair of drain signal lines DL. The common signal line CL and the gate signal line GL both extend in the x direction of FIG. 2A and are arranged in parallel with each other in the y direction of FIG. 2A. The drain signal lines DL extend in the y direction of FIG. 2A and are arranged in parallel with one another in the x direction of FIG. 2A. In FIG. 2A, the drain signal line of the pixel for red color (R), the drain signal line of the pixel for green color (G), and the drain signal line of the pixel for blue color (B) are denoted by DL(R), DL(G), and DL(B), respectively.

Each pixel includes a thin film transistor TFT. The thin film transistor TFT is turned on when a scan signal is supplied to the gate signal line GL. Then, an image signal is supplied from the drain signal line DL to a pixel electrode PX through the turned-on thin film transistor TFT.

Figure 1:
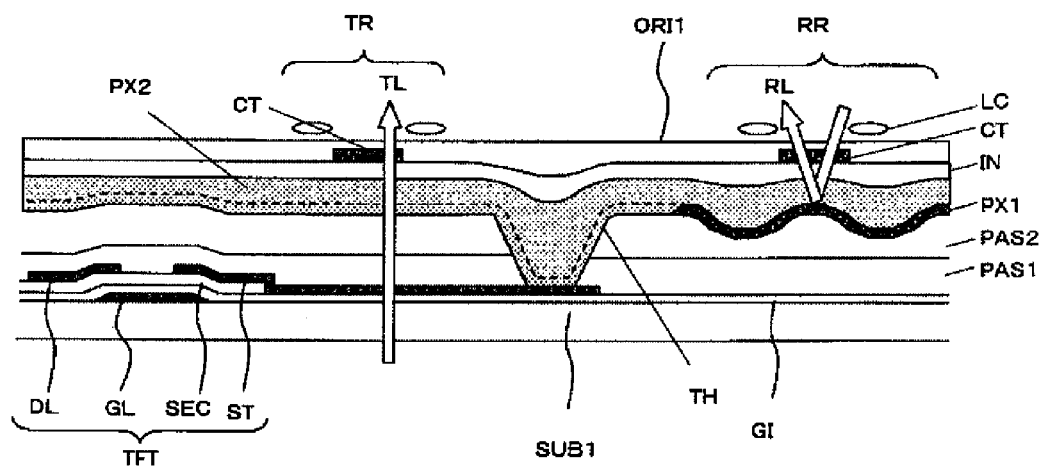
FIG. 1 is a cross-sectional view illustrating an embodiment of a structure of a pixel included in a liquid crystal display device according to the present invention.

An electrode (source electrode) provided on one end of the thin film transistor TFT and the pixel electrode PX are electrically connected to each other through a through hole TH formed in protective films (denoted by PAS2 and PAS1 in FIG. 1). The source electrode extends so as to overlap the drain signal line DL and the common signal line CL, forming a capacitor between the drain signal line DL and the common signal line CL so that image signals supplied to the pixel electrode PX are accumulated for a relatively long time.

A counter electrode CT is provided on the pixel electrode PX via an insulating film (denoted by IN in FIG. 1) so as to overlap the pixel electrode PX. The counter electrode CT includes, for example, a plurality of (for example, two in FIG. 2A) linear electrodes, which extend in the y direction of FIG. 2A and are provided in parallel with each other in the x direction of FIG. 2A, and is electrically connected to the common signal line CL.

The system of the pixel having such a structure is referred to as a so-called in-plane electric field system. A voltage VLC is applied between the pixel electrode PX and the counter electrode CT, whereby an electric field containing a component existing along a plane of a substrate (denoted by SUB1 in FIG. 1) is generated. As a result, liquid crystal molecules are controlled to be turned on/off in an in-plane direction of the substrate.

The pixel region illustrated in FIGS. 2A and 2B is divided into two in, for example, the y direction of FIG. 2A. The pixel region includes a transparent pixel part TR on a lower side of FIG. 2A and a reflective pixel part RR on an upper side of FIG. 2A. As is to be apparent from the description below, the pixel electrode PX in the transparent pixel part TR is formed of a transparent conductive film, and the pixel electrode PX in the reflective pixel part RR includes a metal film excellent in reflection ratio.

FIG. 1 is a cross-sectional view of one of the above-mentioned pixels. Specifically, FIG. 1 illustrates a cross-section taken along a plane crossing the drain signal line DL, the thin film transistor TFT, the counter electrode CT in the transparent pixel part TR, the through hole TH, and the counter electrode CT in the reflective pixel part RR of one of the pixels illustrated in FIGS. 2A and 2B.

First, in FIG. 1, the substrate SUB1 is provided. The substrate SUB1 and another substrate (not illustrated in FIG. 1 and denoted by SUB2 in FIG. 7) hold liquid crystal LC therebetween.

The gate signal line GL is formed on a surface of the substrate SUB1 on a liquid crystal LC side. A gate insulating film GI is formed so as to cover the gate signal line GL.

A semiconductor layer SEC is formed on the gate insulating film GI so as overlap a part of the gate signal line GL. The semiconductor layer SEC serves as a semiconductor layer for the thin film transistor TFT. A drain electrode overlapped with a part of the drain signal line DL and a source electrode ST are formed on the semiconductor layer SEC. A part of the semiconductor layer SEC corresponding to a region between the drain electrode and the source electrode ST forms a channel region above the gate signal line GL. The source electrode ST extends beyond a formation region of the thin film transistor TFT, and has an end portion electrically connected to the pixel electrode PX through the through hole TH as described later.

The first protective film PAS1 and the second protective film PAS2 are formed above the surface of the substrate SUB1 having the drain signal line DL and the source electrode ST formed thereon as described above. The first protective film PAS1 is formed of an inorganic insulating film whereas the second protective film PAS2 is formed of an organic insulating film. Here, the organic insulating film is used as the second protective film PAS2 because the surface thereof may be made flat through application formation.

A plurality of scattered concave portions are formed on a surface of the second protective film PAS2 located on an area corresponding to the reflective pixel part RR. A pixel electrode PX1 is formed of a metal film excellent in reflection efficiency, such as Al, which covers the plurality of concave portions. The pixel electrode PX1 is formed so that the irregularities on the surface of the second protective film PAS2 appear on a surface of the pixel electrode PX1, so as to provide a function of scattering incident light from the outside such as sunlight.

The through hole TH is formed in the second protective film PAS2 and the first protective film PAS1 so that a part of another end of the source electrode ST of the thin film transistor TFT is exposed. The through hole TH is formed in, for example, a region different from a formation region of the pixel electrode PX1. A pixel electrode PX2 described next is electrically connected to the source electrode ST through the thus formed through hole TH.

The pixel electrode PX2 is formed on the upper surface of the second protective film PAS2 which also covers the pixel electrode PX1 and the through hole TH. Here, a material of the pixel electrode PX2 includes a transparent conductive film formed by application (hereinafter, the transparent conductive film may also be referred to as applied transparent conductive film in the subject specification). Therefore, there may be provided an effect that the surface of the pixel electrode PX2 is formed to be flat even on the pixel electrode PX1 having the rough surface thereof and on the through hole TH. The pixel electrode PX2 is described in detail later.

The pixel included in the liquid crystal display device illustrated in FIGS. 1, 2A, and 2B includes the transparent pixel part TR and the reflective pixel part RR. The present invention is not necessarily limited thereto, and may be applied to a liquid crystal display device including a pixel formed only of the transparent pixel part TR. This is because the pixel electrode can still be formed of the applied transparent conductive film.

FIGS. 3A to 3D each illustrate an example of the applied transparent conductive film used as the material of the pixel electrode PX2.

Figure 3A:
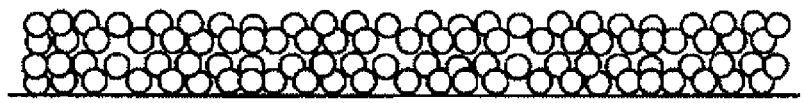
FIGS. 3A to 3D illustrate examples of a structure of an applied transparent conductive film used in the liquid crystal display device according to the present invention.
Figure 3B:
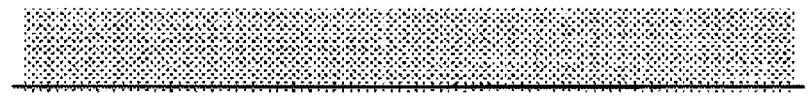
Figure 3C:
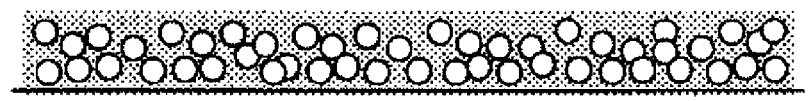
Figure 3D:
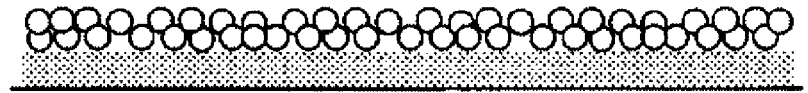

FIG. 3A illustrates a transparent conductive film formed of, for example, corpuscles of a metal oxide such as an indium tin oxide (ITO). The corpuscles of the metal oxide are applied in the form of ink and are baked, to thereby form the transparent conductive film. FIG. 3B illustrates a transparent conductive film formed of, for example, a conductive polymer. The conductive polymer is applied in the form of ink and is baked, to thereby form the transparent conductive film. FIG. 3C illustrates a transparent conductive film formed of, for example, a mixed material containing the corpuscles of the metal oxide such as an ITO and the conductive polymer. The mixed material is applied in the form of ink and is baked, to thereby form the transparent conductive film. FIG. 3D illustrates a transparent conductive film formed of, for example, a laminated member in which the transparent conductive film including the conductive polymer is formed as described above and, on an upper surface thereof, the transparent conductive film including the corpuscles of the metal oxide such as an ITO is formed as described above. Alternatively, there may be used a transparent conductive film (not shown) formed of, for example, a laminated member in which the transparent conductive film including the ITO corpuscles and the transparent conductive film including the conductive polymer are sequentially laminated. It should be noted that an indium zinc oxide (IZO), an indium tin zinc oxide (ITZO), and the like are also known as the metal oxide in addition to ITO. All of the above-mentioned applied transparent conductive films may be formed as the transparent conductive film capable of making flat the surface of the substrate.

The pixel electrode PX2 is directly laminated on the upper surface of the pixel electrode PX1, thereby eliminating the necessity to electrically connect the pixel electrode PX1 to the source electrode ST of the thin film transistor TFT through the through hole TH. Therefore, light transmittance in the vicinity of the through hole TH may be enhanced.

The insulating film IN is formed on the pixel electrode PX2 above the surface of the substrate SUB1, and the insulating film IN also covers the pixel electrode PX2. The counter electrode CT is formed on an upper surface of the insulating film IN. The insulating film IN serves as an interlayer insulating film between the pixel electrode PX2 and the counter electrode CT, and also serves as a dielectric film for forming a capacitor between the pixel electrode PX2 and the counter electrode CT.

An orientation film ORI1 is formed on the counter electrode CT above the surface of the substrate SUB1, and the orientation film ORI1 also covers the counter electrode CT. The orientation film ORI1 is a film which is in a direct contact with the liquid crystal LC and serves to determine an initial orientation direction of molecules of the liquid crystal LC.

In the structure illustrated in FIG. 1, the pixel electrode PX1 is formed outside the formation region of the through hole TH. However, the present invention is not limited thereto. The pixel electrode PX1 may be formed so as to cover the through hole TH.

In the liquid crystal display device having the above-mentioned structure, the pixel electrode PX2 is formed of the applied transparent conductive film. Therefore, the surface of the pixel electrode PX2 may be formed to be flat. The pixel electrode PX1 has irregularities on the surface thereof in the reflective pixel part RR. The thin film transistor TFT has irregularities on the surface thereof in the transparent pixel part TR. However, the pixel electrode PX2 formed of the applied transparent conductive film can absorb those irregularities to prevent the irregularities from appearing on the surface thereof. Therefore, even when the insulating film IN, the counter electrode CT, and the orientation film ORI1 are sequentially laminated and formed on the pixel electrode PX2, the surface of the orientation film ORI1 may be made as a flat surface having greatly reduced irregularities. As a result, there are provided effects that disturbance of the electric field generated in the liquid crystal layer is reduced and a display contrast is enhanced.

In the case of the structure illustrated in FIG. 1, a resin film which is formed through application is used as the protective film PAS2. Therefore, the surface of the protective film PAS2 may be made flat to some extent in the transparent pixel part TR. In addition, the pixel electrode PX2 formed of the applied transparent conductive film is formed in an upper layer of the protective film PAS2, whereby the surface of the pixel electrode PX2 may be further flattened.

In the structure illustrated in FIG. 1, the above-mentioned protective film PAS2 is formed, but the protective film PAS2 may not be provided. This is because the surface of the substrate on a side on which the substrate is in contact with the liquid crystal may be made flat by forming the pixel electrode PX2 of the applied transparent conductive film. Accordingly, the protective film PAS2 does not particularly need to be formed, with the result that the production man-hours may be reduced.

When a film thickness of the applied transparent conductive film is set to the following values, the sheet resistance and light transmittance appropriate for the pixel electrode PX2 may be attained.

Figure 4:
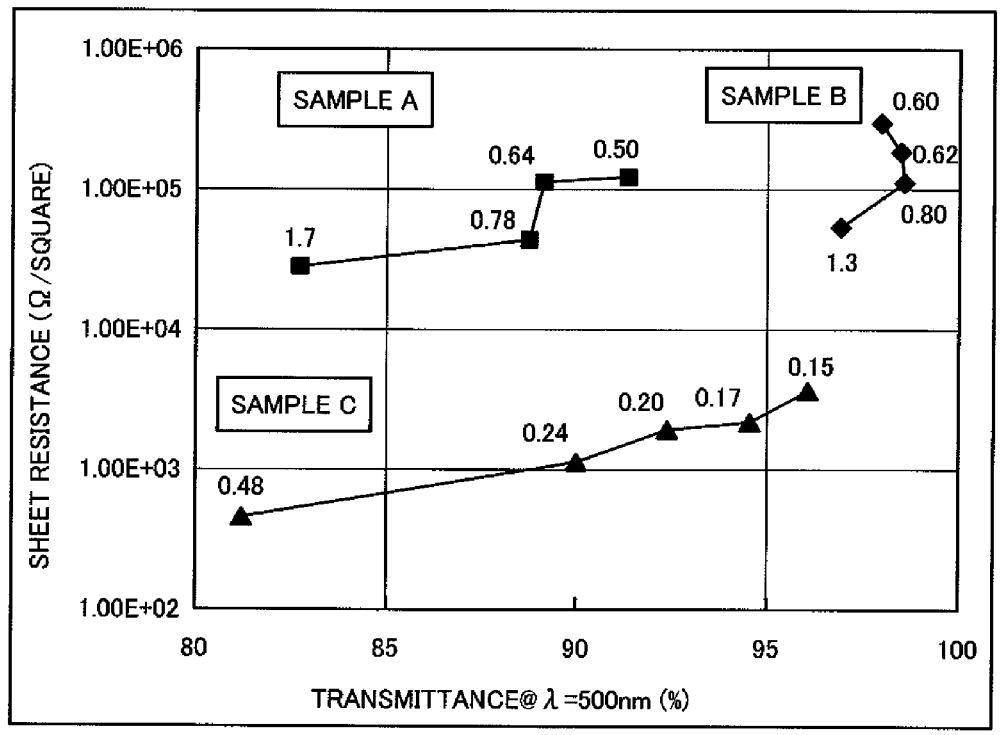
FIG. 4 is a graph illustrating a relation between a sheet resistance and transmittance of the applied transparent conductive film.

FIG. 4 is a graph illustrating a relation between the sheet resistance and transmittance of the applied transparent conductive film with the use of a plurality of samples (A, B, and C). The ordinate of the graph indicates the sheet resistance ($\Omega$/square), and the abscissa thereof indicates the transmittance (%). A light wavelength $\lambda$ used in detection of the transmittance is set to 500 nm. Numerical values shown near the characteristic curve of each of the samples indicate the film thickness ($\mu$m).

Here, with regard to all of the samples (A, B, and C), conductivity thereof becomes higher with a larger number of current paths, and optical absorption thereof is determined by a product of an optical absorption coefficient of a used material and the film thickness. Hence, all of the samples (A, B, and C) have a characteristic that the sheet resistance and transmittance thereof are decreased along with increase in film thickness.

When the above-mentioned pixel electrode PX2 is formed of the applied transparent conductive film, the sheet resistance has to be equal to or lower than a predetermined value in order to follow a driving frequency of image display, while the transmittance has to be equal to or higher than a predetermined value in order not to deteriorate luminance. Accordingly, the sheet resistance and the transmittance have a trade-off relationship with respect to the film thickness of the applied transparent conductive film. Therefore, in order that both the sheet resistance and the transmittance can satisfy the necessary conditions at the same time, an upper limit value and a lower limit value are to be set for the film thickness.

In the graph of FIG. 4, where the characteristic curve passes on a region of the graph varies depending on a type of the sample. Accordingly, when a certain region of the graph (determined by the sheet resistance within a certain range and the transmittance within a certain range) is designated, the sample and its film thickness are identified. The examples illustrated in FIGS. 3A to 3D are applied to the respective samples which are examined in creating of the graph of FIG. 4. The range of the film thickness of each sample may be set according to the ranges of a desired sheet resistance and transmittance to be obtained.

Figure 5:
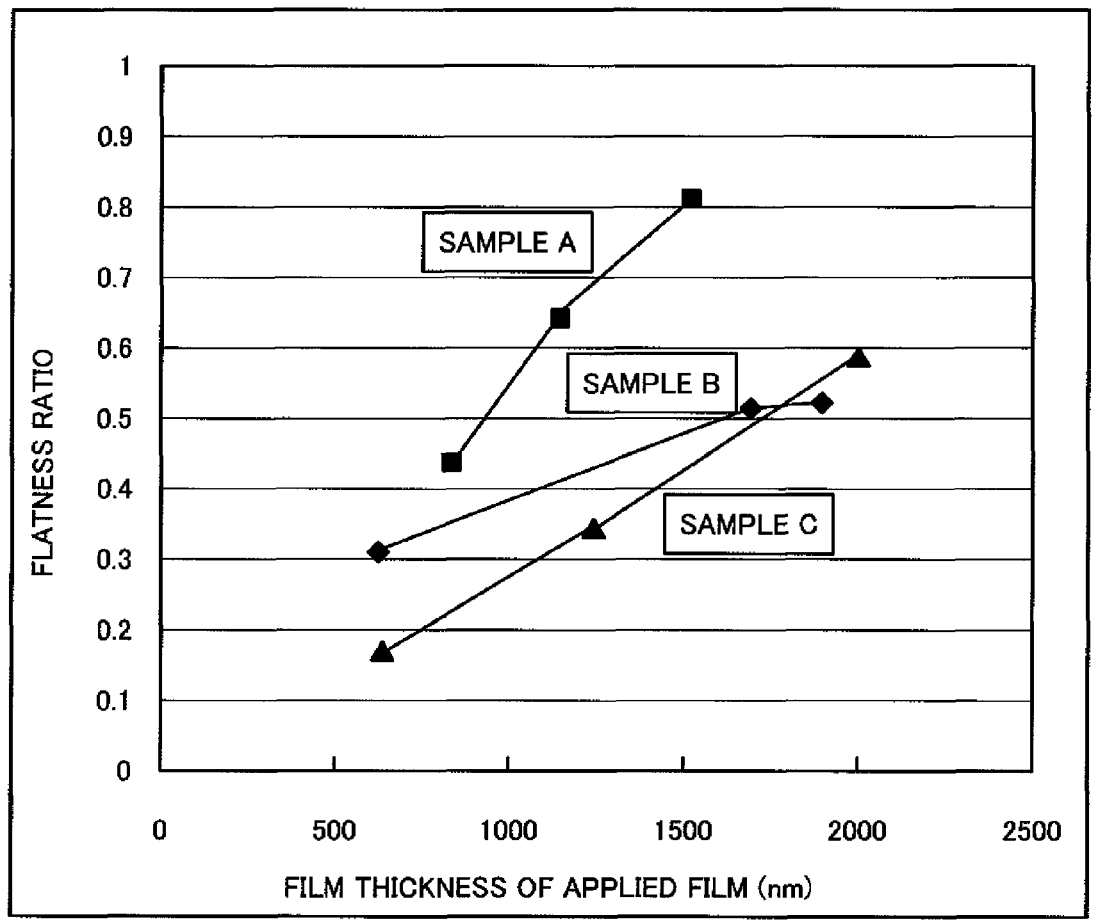
FIG. 5 is a graph illustrating a relation between a film thickness and a flatness ratio of the applied transparent conductive film.

FIG. 5 is a graph illustrating a relation between the film thickness and a flatness ratio of the applied transparent conductive film with the use of the same samples (A, B, and C) as described above. The ordinate of the graph indicates the flatness ratio, and the abscissa thereof indicates the film thickness (nm).

Here, the flatness ratio is a value defined by the equation $(R^a\text{max} - R^b\text{max})/R^a\text{max}$. $R^a\text{max}$ indicates a maximum height of an underlying layer. $R^b\text{max}$ indicates a maximum height of the applied transparent conductive film. Specifically, the flatness ratio is a value calculated from the maximum height of the irregularities on the underlying layer of the applied transparent conductive film and the maximum height of the surface of the applied transparent conductive film. When the surface is completely flat, the flatness ratio becomes 1. When no flatness effect is achieved, the flatness ratio becomes 0.

The flatness ratio is substantially in proportion to the film thickness. The proportionality coefficient tends to be determined by a type of the applied transparent conductive film.

Therefore, with reference to the graph of FIG. 4, it is possible to determine the extent to which the flatness may be realized based on the type and film thickness of the applied transparent conductive film, which are defined by the graph. Conversely, when the flatness ratio within a necessary range is specified, the range of the film thickness may be identified.

The following table shows results obtained by setting, for example, the film thickness of the pixel electrode PX2 according to the type of the used applied transparent conductive film, based on the graphs of FIG. 4 and FIG. 5. According to this table, a desired sheet resistance, transmittance, and flatness level may be obtained for the pixel electrode PX2.

0 μm to 2 μm. The thus obtained applied transparent conductive film is capable of attaining a sheet resistance of $1.0 \times 10E9$ or less, a transmittance of 90% or less, and a flatness level of 0.05 to 0.4.

Next, in the structure of FIG. 1, a description is made of the pixel electrode PX2 in the case where the reflective pixel part RR is not provided and only the transparent pixel part TR is provided so that the pixel electrode PX1 is not formed.

When the transparent conductive film formed of ITO corpuscles, which are applied in the form of ink and are baked as illustrated in FIG. 3A, is used as the applied transparent conductive film, the film thickness thereof is set to 0.1 μm to 3 μm. The thus obtained applied transparent conductive film is capable of attaining a sheet resistance of $1.0 \times 10E5$ or less, a transmittance of 90% or less, and a flatness level of 0.1 to 0.5.

When the transparent conductive film formed of a conductive polymer, which is applied in the form of ink and is baked as illustrated in FIG. 3B, is used as the applied transparent conductive film, the film thickness thereof is set to 0.05 μm to 1 μm. The thus obtained applied transparent conductive film is capable of attaining a sheet resistance of $1.0 \times 10E5$ or less, a transmittance of 90% or less, and a flatness level of 0.01 to 0.3.

When the transparent conductive film formed of a mixed material containing ITO corpuscles and a conductive polymer

TABLE 1

| Underlying electrode | Sheet resistance (Ω/square) | Transmittance (%) | Film thickness (μm) | | Flatness level |
|---|---|---|---|---|---|
| Provided | <1.0 × 10E9 | >90 | ITO | <3 | 0.2~0.5 |
|  |  |  | Polymer | <1 | 0.05~0.3 |
|  |  |  | Mixed material, laminated member | <2 | 0.05~0.4 |
| Not provided | <1.0 × 10E5 | >90 | ITO | 0.1~3 | 0.1~0.5 |
|  |  |  | Polymer | 0.05~1 | 0.01~0.3 |
|  |  |  | Mixed material, laminated member | 0.05~2 | 0.01~0.4 |

First, a description is made of the case where a part of the pixel electrode PX2 directly overlaps the pixel electrode PX1 as illustrated in the structure of FIG. 1. When a part of the pixel electrode PX2 directly overlaps the pixel electrode PX1, the sheet resistance as the pixel electrode including both the pixel electrode PX2 and the pixel electrode PX1 changes (decreases).

When a transparent conductive film formed of ITO corpuscles, which are applied in the form of ink and are baked as illustrated in FIG. 3A, is used as the applied transparent conductive film, the film thickness thereof is set to 0 μm to 3 μm. The thus obtained applied transparent conductive film is capable of attaining a sheet resistance of $1.0 \times 10E9$ or less, a transmittance of 90% or less, and a flatness level of 0.2 to 0.5.

When the transparent conductive film formed of a conductive polymer, which is applied in the form of ink and is baked as illustrated in FIG. 3B, is used as the applied transparent conductive film, the film thickness thereof is set to 0 μm to 1 μm. The thus obtained applied transparent conductive film is capable of attaining a sheet resistance of $1.0 \times 10E9$ or less, a transmittance of 90% or less, and a flatness level of 0.05 to 0.3.

When the transparent conductive film formed of a mixed material containing the ITO corpuscles and the conductive polymer as illustrated in FIG. 3C or including the laminated member formed of the ITO corpuscles and the conductive polymer as illustrated in FIG. 3D, is used as the applied transparent conductive film, the film thickness thereof is set to as illustrated in FIG. 3C or a laminated member formed of ITO corpuscles and a conductive polymer as illustrated in FIG. 3D, is used as the applied transparent conductive film, the film thickness thereof is set to 0.05 μm to 2 μm. The thus obtained applied transparent conductive film is capable of attaining a sheet resistance of $1.0 \times 10E5$ or less, a transmittance of 90% or less, and a flatness level of 0.01 to 0.4.

Figure 6:
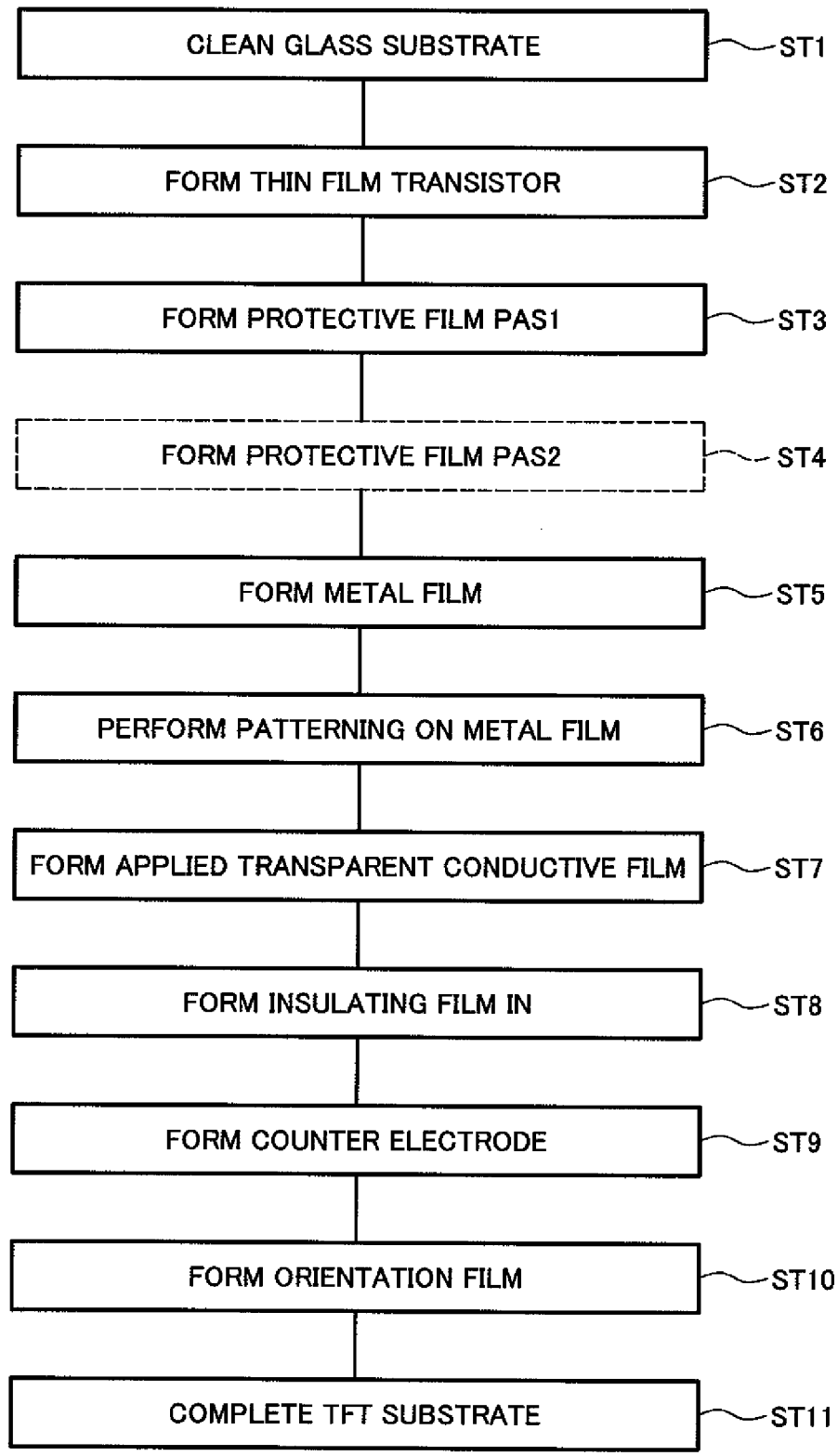
FIG. 6 is a flow chart illustrating an embodiment of a method of manufacturing the liquid crystal display device according to the present invention.

FIG. 6 is a flow chart illustrating an embodiment of a method of manufacturing the liquid crystal display device illustrated FIG. 1. In FIG. 6, the substrate SUB1 made of glass is prepared and then cleaned (ST1). On the surface of the substrate SUB1 on the liquid crystal side, the gate signal line GL, the gate insulating film GI, the semiconductor layer SEC, the drain signal line DL, and the source electrode ST are formed, to thereby form the thin film transistor TFT (ST2). The protective film PAS1 formed of an inorganic insulating film is formed above the surface of the substrate SUB1 so as to cover the thin film transistor TFT (ST3). The protective film PAS2 formed of an organic insulating film is formed on the upper surface of the protective film PAS1. The protective film PAS2 does not necessarily need to be formed (ST4). A metal film such as an Al film is formed on the upper surface of the protective film PAS2 (ST5), and the metal film is patterned to obtain the pixel electrode PX1 (ST6). The applied transparent conductive film is formed to obtain the pixel electrode PX2 (ST7). The insulating film IN is formed so as to cover the pixel electrode PX2 (ST8). The counter electrode CT is formed on the insulating film IN (ST9). The orientation film ORI1 is formed so as to cover the counter electrode CT (ST10). In this way, a so-called TFT substrate is completed (ST11).

Figure 7:
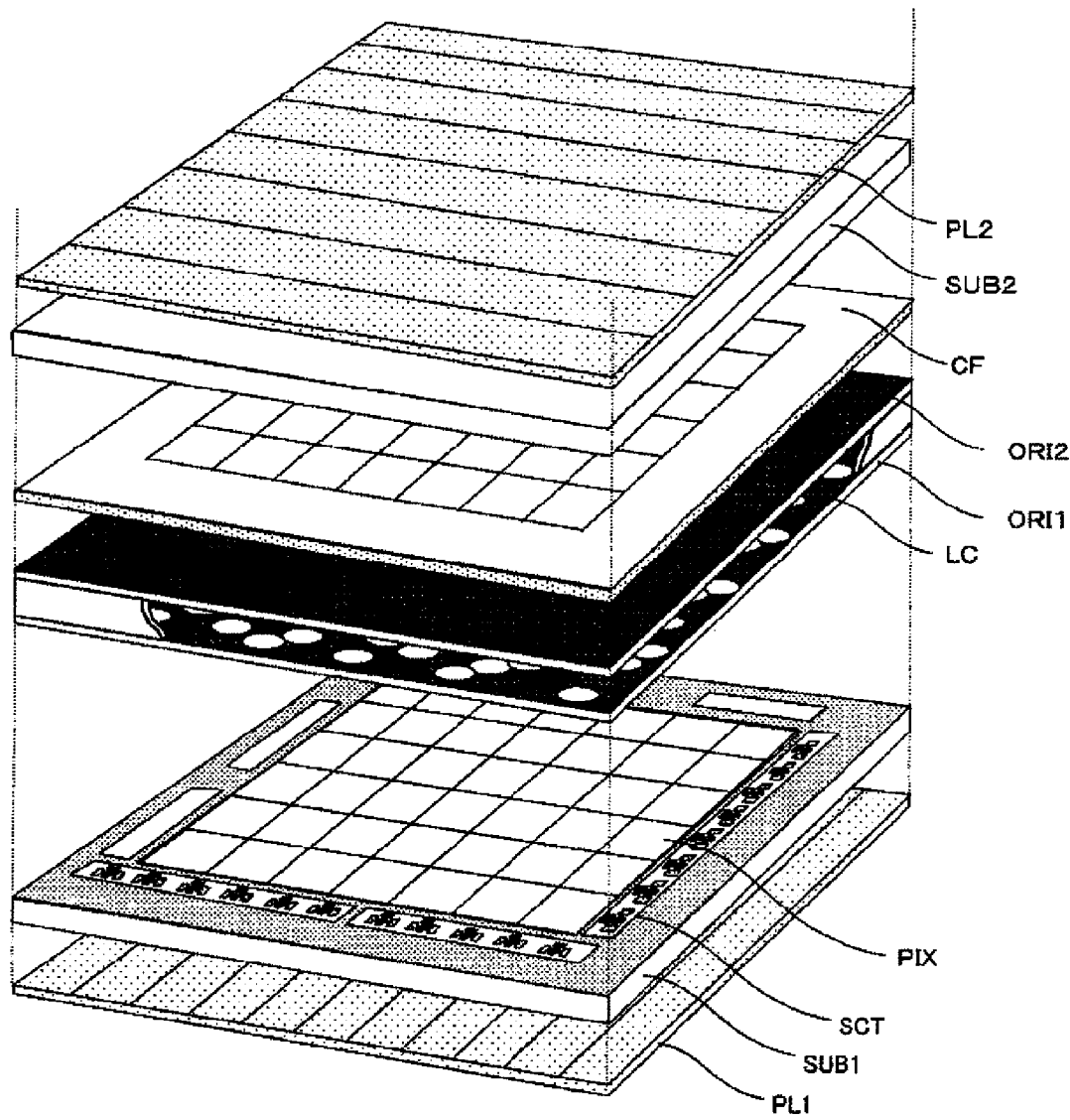
FIG. 7 is an exploded perspective view illustrating an entire structure of the liquid crystal display device according to the present invention.

FIG. 7 is an exploded perspective view illustrating an embodiment of a structure of the liquid crystal display device (panel) including the pixels illustrated in FIGS. 1, 2A, and 2B.

In FIG. 7, first, the TFT substrate SUB1 is provided. A plurality of pixels PIX are formed in matrix on the surface of the TFT substrate SUB1 on the liquid crystal side. A driving circuit SCT is formed on the periphery of the pixels PIX. The orientation film ORI1 is formed above the pixels PIX, and is in a direct contact with the liquid crystal LC. A polarizer PL1 is arranged on a surface of the TFT substrate SUB1 on an opposite side of the liquid crystal side. On the other hand, a filter substrate SUB2 is also provided. A color filter CF is formed on a surface of the filter substrate SUB2 on the liquid crystal side. An orientation film ORI2 is formed on the color filter CF on the liquid crystal side with respect to the color filter CF, and is in a direct contact with the liquid crystal LC. A polarizer PL2 is arranged on a surface of the filter substrate SUB2 on the opposite side of the liquid crystal side.

In the above-mentioned structure, the orientation films ORI1 and ORI2 serve to determine the initial orientation direction of the molecules of the liquid crystal LC. The polarizers PL1 and PL2 serve as an optical plate for visualizing driving of the molecules of the liquid crystal LC.

It should be noted that, in the above-mentioned embodiment, the description is made of the case where the applied transparent conductive film is provided to form the pixel electrode PX2. Alternatively, in the structure illustrated in FIG. 1, the pixel electrode PX1 and a portion indicated as the pixel electrode PX1 in FIG. 1 may be set as a counter electrode while a portion indicated as the counter electrode CT in FIG. 1 may be set as a pixel electrode. In this case, the portion indicated as the counter electrode CT in FIG. 1 is connected to the thin film transistor TFT, and a reference signal for the image signal is supplied to the pixel electrode PX1 and the portion indicated as the pixel electrode PX1 in FIG. 1. In this structure, the counter electrode may be formed of the applied transparent conductive film having the above-mentioned structure.

Figure 8:
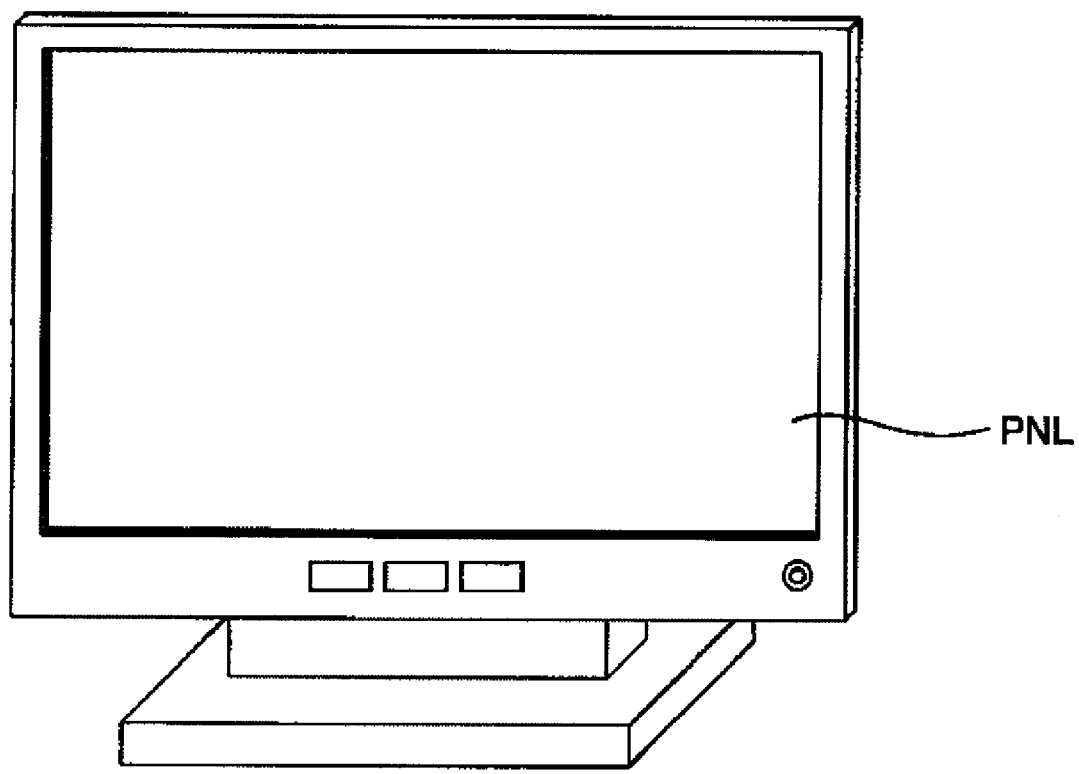
FIG. 8 is a view illustrating a PC monitor to which the liquid crystal display device according to the present invention is applied.
Figure 9:
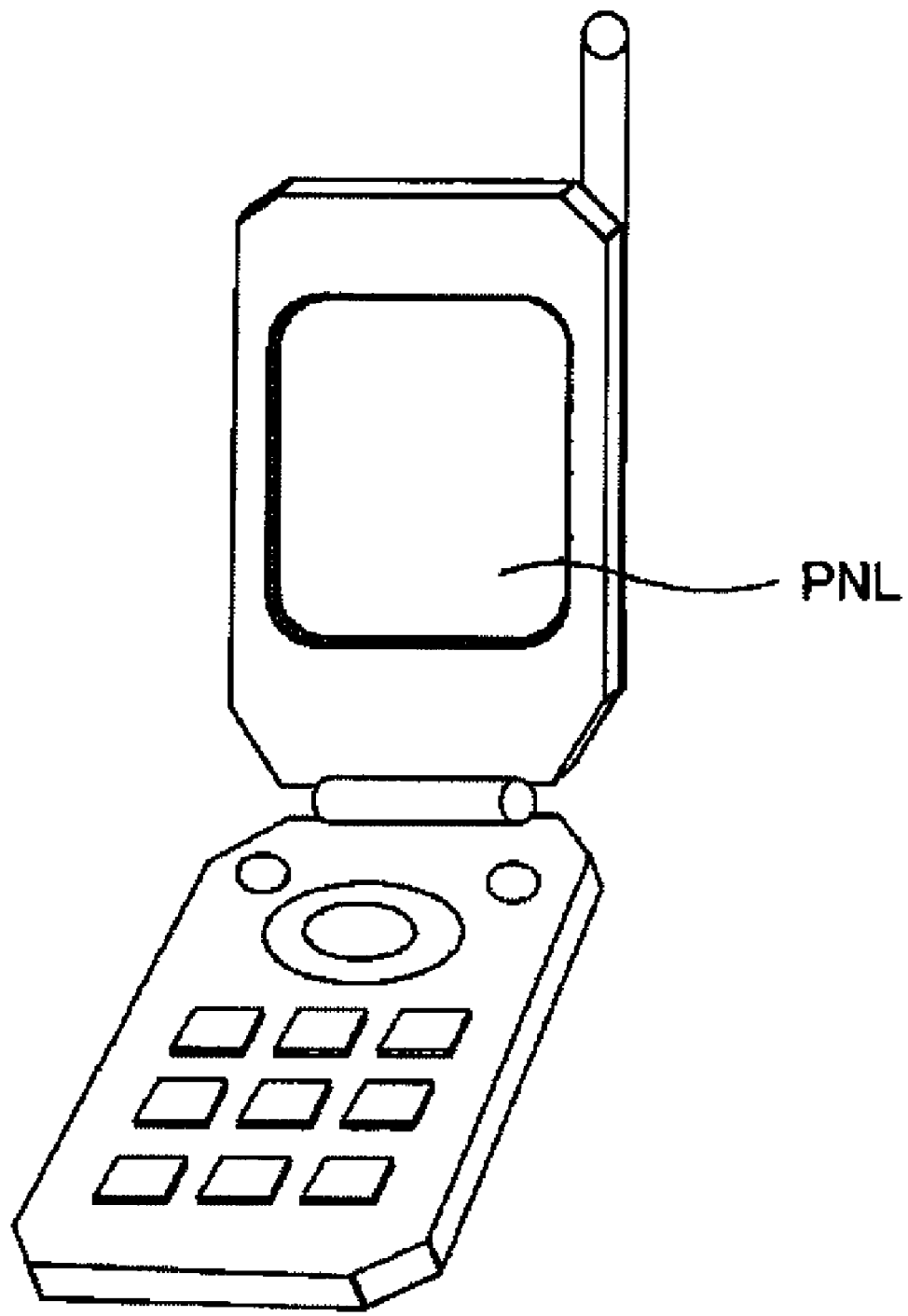
FIG. 9 is a view illustrating a cellular phone to which the liquid crystal display device according to the present invention is applied.
Figure 10:
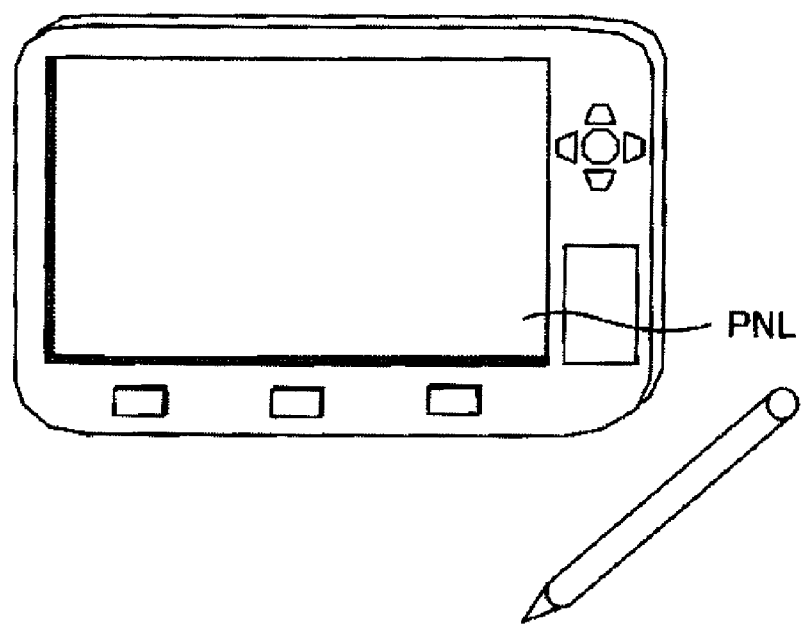
FIG. 10 is a view illustrating a mobile terminal to which the liquid crystal display device according to the present invention is applied.
Figure 11:
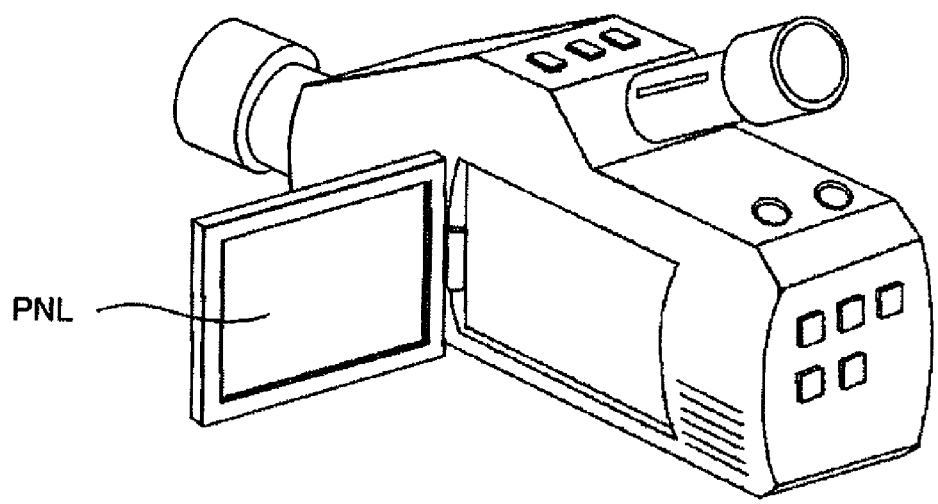
FIG. 11 is a view illustrating a digital camera to which the liquid crystal display device according to the present invention is applied.

FIGS. 8 to 11 illustrate various types of devices including the liquid crystal display device (panel) of FIG. 7. FIG. 8 illustrates a PC monitor which includes a liquid crystal display device PNL according to the present invention incorporated therein. FIG. 9 illustrates a cellular phone which includes the liquid crystal display device PNL according to the present invention incorporated therein. FIG. 10 illustrates a mobile terminal which includes the liquid crystal display device PNL according to the present invention incorporated therein. FIG. 11 illustrates a digital camera which includes the liquid crystal display device PNL according to the present invention incorporated therein.

While there have been described what are at present considered to be certain embodiments of the invention, it is understood that various modifications may be made thereto, and it is intended that the appended claims cover all such modifications as fall within the true spirit and scope of the invention.

What is claimed is:

1. A liquid crystal display device comprising:
liquid crystal;
a substrate including a pixel region formed on a surface thereof on a liquid crystal side;
a thin film transistor, which is formed on the pixel region, and is turned on through supply of a scan signal from a gate signal line;
a pixel electrode, which is formed on the pixel region, and to which an image signal is supplied from a drain signal line via the thin film transistor when the thin film transistor is turned on; and
a counter electrode, which is formed on the pixel region so as to generate an electric field between the counter electrode and the pixel electrode;
wherein the pixel region includes a reflective pixel part and a transparent pixel part;
wherein one of the pixel electrode and the counter electrode includes, on a protective film formed so as to cover the thin film transistor:
a planar metal electrode formed so as to cover irregularities formed in the reflective pixel part; and
a planar transparent electrode formed in the reflective pixel part and the transparent pixel part so as to cover the metal electrode;
wherein another one of the pixel electrode and the counter electrode includes, on an insulating film formed so as to cover the one of the pixel electrode and the counter electrode, a plurality of linear electrodes provided in parallel with one another so as to overlap the one of the pixel electrode and the counter electrode;
wherein the transparent electrode included in the one of the pixel electrode and the counter electrode is formed of a transparent conductive film which is formed through application; and
wherein the transparent conductive film is formed of a conductive polymer, which is applied in a form of ink and is baked.

2. A liquid crystal display device comprising:
liquid crystal;
a substrate including a pixel region formed on a surface thereof on a liquid crystal side;
a thin film transistor, which is formed on the pixel region, and is turned on through supply of a scan signal from a gate signal line;
a pixel electrode, which is formed on the pixel region, and to which an image signal is supplied from a drain signal line via the thin film transistor when the thin film transistor is turned on; and
a counter electrode, which is formed on the pixel region so as to generate an electric field between the counter electrode and the pixel electrode,
wherein the pixel region includes a reflective pixel part and a transparent pixel part,
wherein one of the pixel electrode and the counter electrode includes, on a protective film formed so as to cover the thin film transistor:
a planar metal electrode formed so as to cover irregularities formed in the reflective pixel part; and
a planar transparent electrode formed in the reflective pixel part and the transparent pixel part so as to cover the metal electrode,
wherein another one of the pixel electrode and the counter electrode includes, on an insulating film formed so as to cover the one of the pixel electrode and the counter electrode, a plurality of linear electrodes provided in parallel with one another so as to overlap the one of the pixel electrode and the counter electrode,
wherein the transparent electrode included in the one of the pixel electrode and the counter electrode is formed of a transparent conductive film which is formed through application; and
wherein the transparent conductive film is formed of corpuscles of an indium tin oxide and a conductive polymer, which are applied in a form of ink and are baked.

3. A liquid crystal display device comprising:

liquid crystal;

a substrate including a pixel region formed on a surface thereof on a liquid crystal side;

a thin film transistor, which is formed on the pixel region, and is turned on through supply of a scan signal from a gate signal line;

a pixel electrode, which is formed on the pixel region, and to which an image signal is supplied from a drain signal line via the thin film transistor when the thin film transistor is turned on; and a counter electrode, which is formed on the pixel region so as to generate an electric field between the counter electrode and the pixel electrode, wherein the pixel region includes a reflective pixel part and a transparent pixel part, wherein one of the pixel electrode and the counter electrode includes, on a protective film formed so as to cover the thin film transistor:

a planar metal electrode formed so as to cover irregularities formed in the reflective pixel part; and a planar transparent electrode formed in the reflective pixel part and the transparent pixel part so as to cover the metal electrode, wherein another one of the pixel electrode and the counter electrode includes, on an insulating film formed so as to cover the one of the pixel electrode and the counter electrode, a plurality of linear electrodes provided in parallel with one another so as to overlap the one of the pixel electrode and the counter electrode, wherein the transparent electrode included in the one of the pixel electrode and the counter electrode is formed of a transparent conductive film which is formed through application; and wherein the transparent conductive film includes a plurality of layers, the plurality of layers including:

a film formed of corpuscles of an indium tin oxide, which are applied in a form of ink and are baked; and a film formed of a conductive polymer, which is applied in a form of ink and is baked.

4. A liquid crystal display device according to claim 3, wherein the transparent conductive film has a film thickness of not more than 2 µm.

5. A liquid crystal display device according to claim 1, wherein the transparent conductive film has a film thickness of not more than 1 µm.

6. A liquid crystal display device according to claim 2, wherein the transparent conductive film has a film thickness of not more than 2 µm.

7. A liquid crystal display device comprising:

liquid crystal;

a substrate;

a thin film transistor, which is formed on a surface of the substrate on a liquid crystal side, and is turned on through supply of a scan signal from a gate signal line;

a pixel electrode, which is formed on the surface of the substrate on the liquid crystal side, and to which an image signal is supplied from a drain signal line via the thin film transistor when the thin film transistor is turned on; and a counter electrode, which is formed on the pixel region so as to generate an electric field between the counter electrode and the pixel electrode, wherein one of the pixel electrode and the counter electrode includes a planar transparent electrode formed on a protective film formed so as to cover the thin film transistor, wherein another one of the pixel electrode and the counter electrode includes, on an insulating film formed so as to cover the one of the pixel electrode and the counter electrode, a plurality of linear electrodes provided in parallel with one another so as to overlap the one of the pixel electrode and the counter electrode, wherein the one of the pixel electrode and the counter electrode is formed of a transparent conductive film which is formed through application; and wherein the transparent conductive film is formed of a conductive polymer, which is applied in a form of ink and is baked.

8. A liquid crystal display device comprising:

liquid crystal;

a substrate;

a thin film transistor, which is formed on a surface of the substrate on a liquid crystal side, and is turned on through supply of a scan signal from a gate signal line;

a pixel electrode, which is formed on the surface of the substrate on the liquid crystal side, and to which an image signal is supplied from a drain signal line via the thin film transistor when the thin film transistor is turned on; and a counter electrode, which is formed on the pixel region so as to generate an electric field between the counter electrode and the pixel electrode, wherein one of the pixel electrode and the counter electrode includes a planar transparent electrode formed on a protective film formed so as to cover the thin film transistor, wherein another one of the pixel electrode and the counter electrode includes, on an insulating film formed so as to cover the one of the pixel electrode and the counter electrode, a plurality of linear electrodes provided in parallel with one another so as to overlap the one of the pixel electrode and the counter electrode, wherein the one of the pixel electrode and the counter electrode is formed of a transparent conductive film which is formed through application; and wherein the transparent conductive film is formed of corpuscles of an indium tin oxide and a conductive polymer, which are applied in a form of ink and are baked.

9. A liquid crystal display device comprising:

liquid crystal;

a substrate;

a thin film transistor, which is formed on a surface of the substrate on a liquid crystal side, and is turned on through supply of a scan signal from a gate signal line;

a pixel electrode, which is formed on the surface of the substrate on the liquid crystal side, and to which an image signal is supplied from a drain signal line via the thin film transistor when the thin film transistor is turned on; and a counter electrode, which is formed on the pixel region so as to generate an electric field between the counter electrode and the pixel electrode, wherein one of the pixel electrode and the counter electrode includes a planar transparent electrode formed on a protective film formed so as to cover the thin film transistor, wherein another one of the pixel electrode and the counter electrode includes, on an insulating film formed so as to cover the one of the pixel electrode and the counter electrode, a plurality of linear electrodes provided in parallel with one another so as to overlap the one of the pixel electrode and the counter electrode, wherein the one of the pixel electrode and the counter electrode is formed of a transparent conductive film which is formed through application; and wherein the transparent conductive film includes a plurality of layers, the plurality of layers including:

a film formed of corpuscles of an indium tin oxide, which are applied in a form of ink and are baked; and a film formed of a conductive polymer, which is applied in a form of ink and is baked.

10. A liquid crystal display device according to claim 9, wherein the transparent conductive film has a film thickness of not more than 2 µm.

11. A liquid crystal display device according to claim 7, wherein the transparent conductive film has a film thickness of 0.05 µm to 1 µm.

12. A liquid crystal display device according to claim 8, wherein the transparent conductive film has a film thickness of 0.05 µm to 2 µm.

* * * * *